(12) United States Patent
Uduki

(10) Patent No.: US 7,697,182 B2
(45) Date of Patent: Apr. 13, 2010

(54) SCANNING OPTICAL APPARATUS AND IMAGE FORMING APPARATUS WHEREIN A ROUTE OF THE SECOND LASER BEAM REFLECTED BY THE FIRST ROTATING POLYGON MIRROR AND A ROUTE OF THE THIRD LASER BEAM REFLECTED BY THE SECOND ROTATING POLYGON MIRROR CROSS EACH OTHER IN THE OPTICAL BOX

(75) Inventor: Kazuo Uduki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 11/873,307

(22) Filed: Oct. 16, 2007

(65) Prior Publication Data

US 2008/0094678 A1 Apr. 24, 2008

(30) Foreign Application Priority Data

Oct. 23, 2006 (JP) ............................. 2006-287850

(51) Int. Cl.
G02B 26/12 (2006.01)
(52) U.S. Cl. .................................................. 359/201.1
(58) Field of Classification Search ... 359/201.1–201.2, 359/204.1–204.5; 347/224, 225, 232, 233, 347/256–261
See application file for complete search history.

(56) References Cited

U.S. PATENT DOCUMENTS 6,954,296 B2 * 10/2005 Takakubo ................ 359/207.1
2003/0210324 A1 * 11/2003 Sung et al. ................ 347/241

FOREIGN PATENT DOCUMENTS

JP 2005-208176 8/2005
JP 2005-242131 9/2005

* cited by examiner

Primary Examiner—Stephone B Allen
Assistant Examiner—Jennifer L. Doak
(74) Attorney, Agent, or Firm—Fitzpatrick, Cella, Harper & Scinto

(57) ABSTRACT

A scanning optical apparatus includes two deflectors that are driven by motors to deflect laser beams. One of the deflectors is provided while inclined by about 10° from an attaching reference plane in an optical box, and the other deflector is provided in parallel with the attaching reference plane. An image forming apparatus provided with the image forming apparatus includes four photosensitive drums corresponding to Y, M, C, and K colors. In the image forming apparatus, the photosensitive drums corresponding to Y, M, C, and K colors are alternately irradiated with laser beam fluxes from the deflectors. Accordingly, the two photosensitive drums corresponding to the K and M colors are irradiated with one of the deflectors, and the two photosensitive drums corresponding to the C and Y colors are irradiated with the other deflector.

12 Claims, 4 Drawing Sheets

SCANNING OPTICAL APPARATUS AND IMAGE FORMING APPARATUS WHEREIN A ROUTE OF THE SECOND LASER BEAM REFLECTED BY THE FIRST ROTATING POLYGON MIRROR AND A ROUTE OF THE THIRD LASER BEAM REFLECTED BY THE SECOND ROTATING POLYGON MIRROR CROSS EACH OTHER IN THE OPTICAL BOX

BACKGROUND OF THE INVENTION

1. Field of the Invention

The present invention relates to an electrophotographic image forming apparatus (hereinafter simply referred to as "image forming apparatus") such as a copying machine, a facsimile, a printer, and a multi function peripheral which is of a multi-function copying machine and a scanning optical apparatus incorporated into the image forming apparatus.

2. Description of the Related Art

Generally, in the scanning optical apparatus incorporated into the copying machine, the laser beam printer and the like, a light beam emitted from a laser beam source is deflected with a deflector and collected with an imaging optical system such as an f-θ lens, a beam spot is formed on a photosensitive drum which is of an image bearing member, and the photosensitive drum surface is scanned by the beam spot. For example, in a tandem type color image forming apparatus in which four photosensitive drums corresponding to Y (yellow), M (magenta), C (cyan), and K (black) colors are arranged to form a multi-color image using Y, M, C, and K developers (hereinafter simply referred to as "toners"), laser beams emitted from laser beam sources are deflected, the photosensitive drums are scanned with the laser beams to form electrostatic latent images respectively. The electrostatic latent images are developed to four toner images with Y, M, C, and K development devices respectively, and the toner images are sequentially superposed and transferred onto an endless belt which is of an intermediate transfer member. The toner images transferred onto the intermediate transfer member belt are further transferred to a sheet. Then, the sheet is delivered to a fixing device, and the toner images are heated and pressurized to permanently fix the toner image onto the sheet.

For the tandem type image forming apparatus, there has been proposed an image forming apparatus in which one deflector are commonly used for the four photosensitive drums for the Y, M, C, and K colors.

In this case, the laser beam from the deflector toward the photosensitive drums is divided. In the laser beam separation method, there is a technique in which the laser beam is obliquely incident from each laser beam source to the deflector to provide an angle difference between the incident and reflected beams (obliquely incident optical system). In the laser beam separation method, there is also proposed a technique in which a height of the deflector is increased to provide plural deflection and reflection points in a vertical direction (for example, see Japanese Patent Application Laid-Open No. 2005-242131).

In the photosensitive drums in which the deflector is commonly used, because the plural laser beams pass through different heights in a sub-scanning direction on a single imaging lens, an amount of change in imaging position depends on the laser beam when an environmental temperature is changed, which results in color shift on an image. Because the deflector is located in the central portion of an optical box, it is necessary that plural reflecting mirrors be provided to increase an optical path length in the optical box. This causes a problem in that a structure is complicated as a whole.

On the other hand, in the tandem type image forming apparatus, there has been proposed a structure in which two deflectors and four photosensitive drums corresponding to the Y, M, C, and K colors is accommodated in a optical box. Each of the two deflectors is commonly used by the two photosensitive drums (for example, see Japanese Patent Application Laid-Open No. 2005-208176).

However, in this case, because each optical system is accommodated in a half of the total length of the optical box, when the optical path length is increased in the optical box, laser beams from the adjacent deflectors interfere with each other at the central position. Adoption of a structure in which the deflectors are forced away from each other leads to upsizing of the apparatus. When the number of reflecting times by the mirror is increased to increase the optical path length, the number of reflecting mirrors is increased to cause a problem of the complicated entire structure. The problem of the complicated entire structure is also generated in the case where the deflectors of the obliquely incident optical system are disposed while facing each other. This is attributed to the fact that, because a laser beam incident angle is not increased too much due to the color shift, the laser beams deflected by the deflectors interfere with each other or the laser beams are brought into close to each other.

Generally, a plane inclination correcting optical system is adopted when the deflector is used, there is a conjugate relationship between the deflector and the photosensitive drum surface in the sub-scanning direction, and an imaging optical system are commonly used in the Y, M, C, and K colors.

Therefore, it is necessary that the optical path lengths from the reflecting surfaces of the deflectors to the photosensitive drum surfaces of the Y, M, C, and K colors be matched with one another. Accordingly, in the scanning optical apparatus, each optical path is appropriately folded in the sub-scanning direction by the reflecting mirror and the like such that the optical paths from the deflection and reflection plane to the photosensitive drum surfaces are matched with another.

There is a limitation to a space which can be utilized in the image forming apparatus. In order to effectively use the limited space, desirably the optical path is shortened as much as possible outside the scanning optical apparatus.

SUMMARY OF THE INVENTION

In view of the foregoing, the invention provides a scanning optical apparatus, incorporated in the image forming apparatus, in which the optical path can be lengthened without enlarging the apparatus or providing a mirror.

An aspect according to the invention provides a scanning optical apparatus including a first polygon mirror which deflects a first laser beam; a second polygon mirror which deflects a second laser beam, a rotating axis of the second polygon mirror being inclined from a rotating axis of the first polygon mirror; a plurality of mirrors which reflect the laser beams deflected by the first and second polygon mirrors; and an optical box in which the first and second polygon mirrors and the plurality of mirrors are accommodated.

DESCRIPTION OF THE EMBODIMENTS

A scanning optical apparatus and an image forming apparatus according to an exemplary embodiments of the invention will be described in detail with reference to the drawings.

(Image Forming Apparatus)

Figure 4:
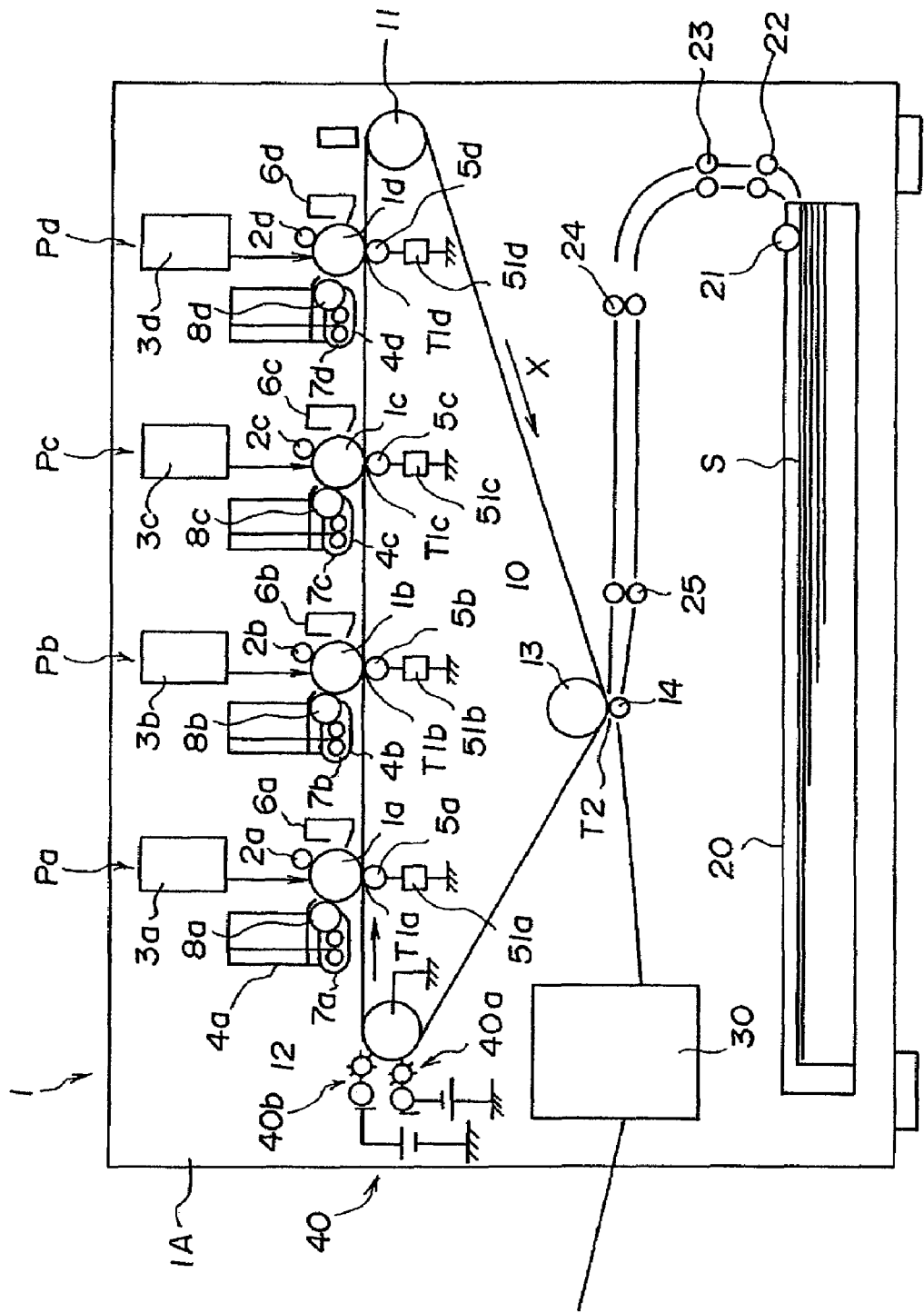
FIG. 4 shows an entire color laser beam printer which is of an example of the image forming apparatus provided with the scanning optical apparatus of the embodiment.

FIG. 4 shows a configuration of a color laser beam printer main body 1 which is of an image forming apparatus according to an exemplary embodiment of the invention in which an image is formed through an electrophotographic process. Four image forming stations Pa, Pb, Pc, and Pd are arranged in a tandem structure of the color laser beam printer main body 1.

The image forming stations Pa to Pd include photosensitive drums 1a, 1b, 1c, and 1d which are of the image bearing members for bearing the electrostatic latent images respectively. A development device and the like are disposed around each of the photosensitive drums 1a to 1d, the electrostatic latent image formed on the photosensitive drum 1 by each image forming station is visualized to form the toner image using the developer (toner), and the toner image is transferred onto a sheet S such as recording paper. In the embodiment, the image forming stations Pa to Pd form the images using the Y (yellow), M (magenta), C (cyan), and K (black) color component toners respectively.

In the printer main body 1, a charging roller 2a, a development device 4a, and a cleaner 6a are disposed in order along a drum rotating direction around the photosensitive drum 1a. A transfer portion is disposed below the photosensitive drums 1a to 1d. The transfer portion includes an endless transfer belt 10 and transfer rollers 5a to 5d. The transfer belt 10 for conveying the sheet S is commonly used in the image forming stations 1Pa to 1Pd. Supply devices 8a to 8d fill development devices 4a to 4d with the predetermined amounts of Y, M, C, and K color toners respectively.

The color laser beam printer main body 1 of the embodiment having the above configuration is operated as follows.

The sheet S fed from a sheet cassette 20 is sequentially conveyed by the transfer belt 10, and the Y, M, C, and K color toner images formed on the photosensitive drums 1a to 1d are transferred.

When the transfer process is ended in the transfer portion, the sheet S is separated from the transfer belt 10. The sheet S to which the toner images are transferred is introduced to a fixing device 30, and the sheet S is heated and pressurized to fix the toner image, and the sheet S is discharged to a discharge tray.

Figure 1:
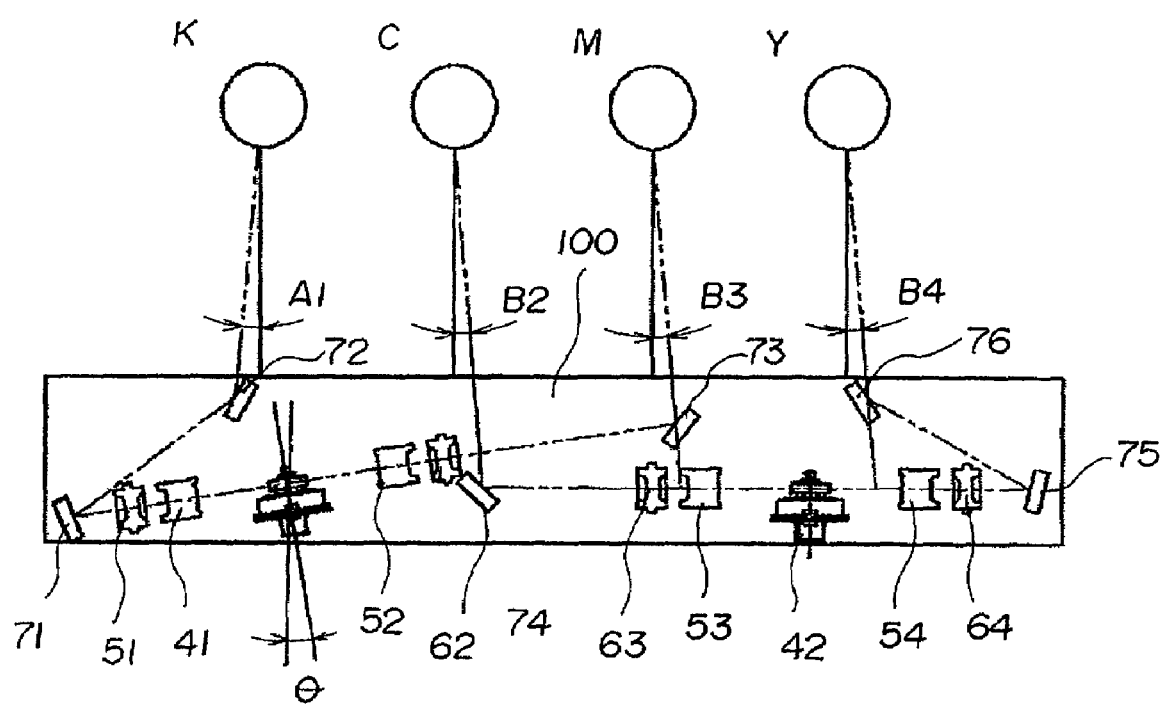
FIG. 1 shows a scanning optical apparatus incorporated into an image forming apparatus according to an exemplary embodiment of the invention.

FIG. 1 shows a deflector portion which is of a main part of the scanning optical apparatus of the embodiment incorporated into the printer main body 1. FIG. 1 is a sectional view showing an optical box when viewed from a rotating axial direction of the photosensitive drum. The photosensitive drums 1a to 1d are arranged in a predetermined direction while the rotating axes of the photosensitive drums 1a to 1d are parallel to one another.

First Embodiment

Scanning Optical Apparatus

Figure 2:
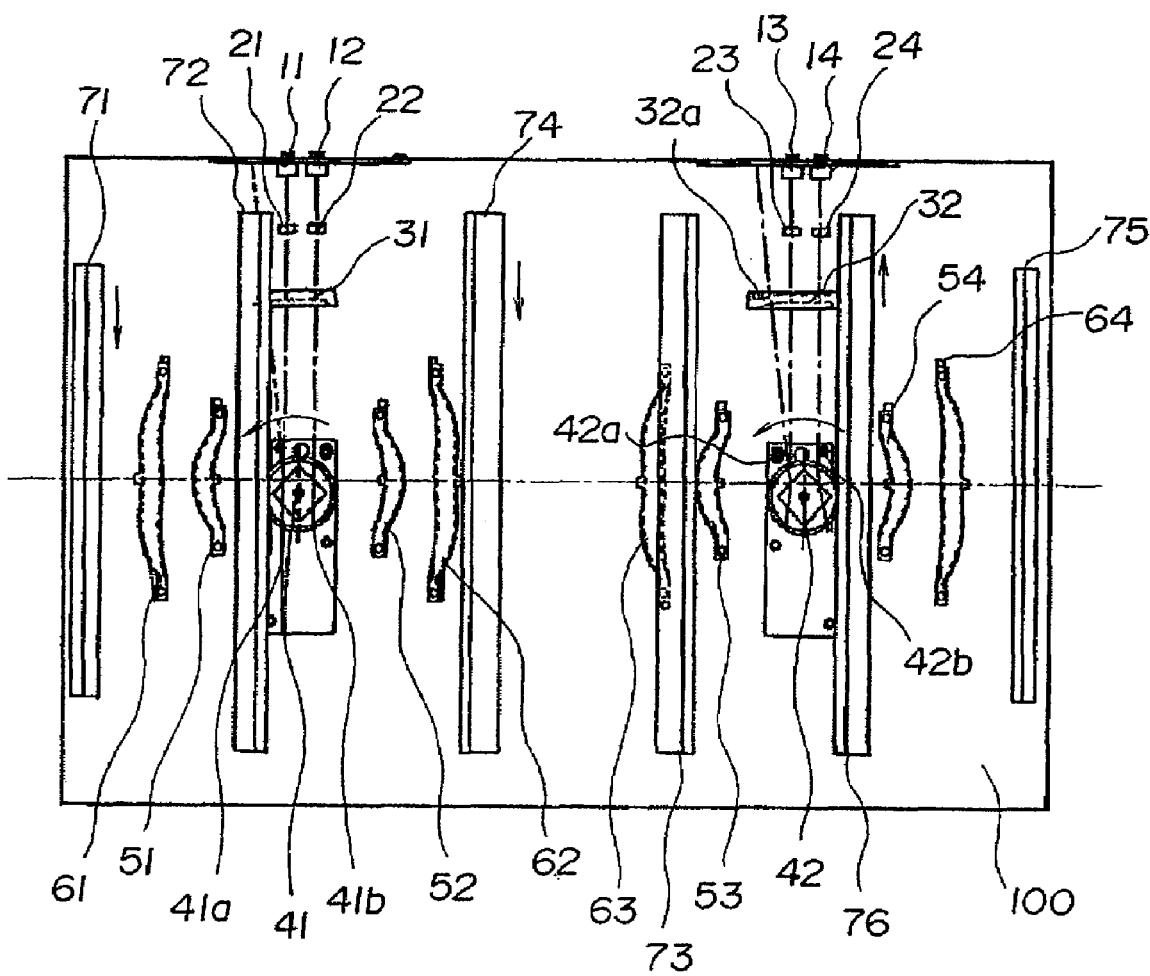
FIG. 2 shows a scanning optical apparatus according to a first embodiment of the invention.

As shown in FIG. 2, the scanning optical apparatus includes four laser beam sources 11, 12, 13, and 14 which emit laser beam fluxes corresponding to Y, M, C, and K colors. The laser beam sources 11 to 14 and four collimator lenses 21, 22, 23, and 24 are accommodated in the optical box. The collimator lenses 21 to 24 cause the laser beam to converge to parallel light beam fluxes respectively. The scanning optical apparatus includes compound cylindrical lenses 31 and 32. The compound cylindrical lenses 31 and 32 correspond to each two of the laser beam sources 11 and 12, and 13 and 14, and the compound cylindrical lenses 31 and 32 collect the laser beam fluxes on polygon mirrors in a long line shape in a main scanning direction.

The scanning optical apparatus includes two deflectors 41 and 42 (first and second polygon mirror) which are polygon mirrors driven by brushless motors. For example, the deflector 41 deflects the K and C color laser beam fluxes, and the deflector 42 deflects the M and Y color laser beam fluxes. The deflector 42 is accommodated such that a deflection plane is substantially parallel to an attaching reference plane in an optical box 100. The optical box 100 has a bottom surface for supporting a lens and the like provided in the optical box and a side faces (sidewalls) surrounding the bottom surface. In the embodiment, the attaching reference plane is parallel to the bottom surface of the optical box. As used herein, the deflection plane shall mean a plane formed by the laser beam when the laser beam is deflected and scanned by each of the deflectors 41 and 42.

As shown by θ of FIG. 1, the deflector 41 is accommodated such that the deflection plane is inclined in the direction of the scanning optical axis by an angle of about 10° from the attaching reference plane. The reason why the deflection plane of the deflector 41 is attached so as to be inclined from the attaching reference plane is as follows.

It is assumed that a size in a lengthwise direction of the optical box is set in a range of about 300 to about 400 mm and a height is set in a range of about 60 to about 100 mm. In this case, an angle toward a diagonal direction ranges from about 8 to about 15° in a rectangular section formed by the lengthwise direction of the optical box and the height. Accordingly, the rotating axis of the deflector 41 is inclined by about 8 to about 15° from the direction normal to the bottom surface of the optical box. That is, the deflection plane of the deflector 41 is inclined from the bottom surface of the optical box so as to be brought close to the diagonal direction of the optical box. This enables a space in the optical box to be effectively used to prevent the upsizing of the optical box. In the embodiment, the rotating axis of the deflector 41 is inclined by about 10°.

The scanning optical systems are provided for each of the K, C, M, and Y colors after the laser beam fluxes are deflected by the deflectors 41 and 42, and the scanning optical systems focus the laser beam fluxes deflected by the deflectors 41 and 42 on the photosensitive drums corresponding to the Y, M, C, and K colors respectively. The scanning optical systems include first imaging lenses 51, 52, 53, and 54, second imaging lenses 61, 62, 63, and 64, and reflecting mirrors 71, 72, 73, 74, 75, and 76. The reflecting mirrors 71 to 76 are formed by single reflecting mirror or by coupling the two reflecting mirrors. The first imaging lenses 51 to 54 and the second imaging lenses 61 to 64 perform f-θ correction of the scanning light, and the imaging in the sub-scanning direction is mainly performed by the second imaging lenses 61 to 64.

A configuration in which the laser beams are deflected to scan the photosensitive drums by the deflectors 41 and 42 will be described in detail with reference to FIG. 2.

The laser beam sources 13 and 14 are disposed in parallel while separated from each other by a predetermined distance, in order that the polygon mirror included in the deflector 42 is rotated by a motor to perform symmetrical scanning in a horizontal direction. The collimator lenses 23 and 24 independently disposed on the optical axes form the laser beam fluxes which are of the divergent light beams emitted from the laser beam sources 13 and 14 into parallel light beam fluxes. At this point, the collimator lenses 23 and 24 are adjusted and fixed to positions where irradiation positions and focusing positions are ensured for the laser beam fluxes respectively. The two parallel laser beam fluxes are focused in the sub-scanning direction by a compound cylindrical lens 32 in which a BD lens and a cylindrical lens are integrally molded, and a line image is formed at a reflecting point on the polygon mirror of the deflector.

Using the first imaging lens 54 and the second imaging lens 64 which are of the f-θ lens, the f-θ correction is performed to the laser beam flux which is reflected and deflected near a point 42b on the polygon mirror surface in the deflector 42. The laser beam flux to which the f-θ correction is performed is reflected toward an inside direction of the optical box by the reflecting mirror 75 provided in one end portion of the optical box 100. Then, the laser beam flux is reflected upward by the reflecting mirror 76, the laser beam flux proceeds toward an irradiation point direction in the surface of the photosensitive drum corresponding to the Y color, and the laser beam flux is imaged on the surface of the photosensitive drum corresponding to the Y color.

Using the first imaging lens 53 and the second imaging lens 63 which are of the f-θ lens, the f-θ correction is performed to the laser beam flux which is reflected and deflected near a point 42a on the polygon mirror surface in the deflector 42. The laser beam flux to which the f-θ correction is performed proceeds toward the central portion of the optical box 100 and passes through the center position of the optical box 100. Then, the laser beam flux is reflected upward by the reflecting mirror 74 disposed on the side of the deflector 41, the laser beam flux passes through M color adjacent to the Y color, the laser beam flux proceeds toward the irradiation point direction in the surface of the photosensitive drum corresponding to the C color adjacent the M color, and the laser beam flux is imaged on the surface of the photosensitive drum corresponding to the C color. That is, after the laser beam deflected from the deflector 42 is reflected by the reflecting mirror 74, the laser beam intersects the laser beam deflected from the deflector 41 in the optical box, and the laser beam is outputted from the optical box. Thus, the optical path is set to the depth direction farther than the center position of the optical box 100, so that the external optical path length can be shortened with the one reflecting mirror.

In the laser beam fluxes deflected by the deflector 42, the laser beam flux toward the BD lens side is detected by a BD sensor (not shown) and used as a trigger signal for starting image write. Because of a single BD signal for the deflector 42, the BD signal is used as the trigger signal for starting image write of both the Y and C colors.

On the other hand, the laser beam sources 11 and 12 are disposed in parallel while separated from each other by a predetermined distance, in order that the polygon mirror on the deflector 41 is rotated to perform the symmetrical scanning in the horizontal direction. The collimator lenses 21 and 22 independently disposed on the optical axes form the laser beam fluxes which are of the divergent light beams emitted from the laser beam sources 11 and 12 into parallel light beam fluxes. At this point, the collimator lenses 21 and 22 are adjusted and fixed to positions where irradiation positions and focusing positions are ensured for the laser beam fluxes respectively. The two parallel laser beam fluxes are focused in the sub-scanning direction by a compound cylindrical lens 32 in which the BD lens and the cylindrical lens are integrally molded, and the line image is formed at the reflecting point on the polygon mirror of the deflector 41.

In the first embodiment, it is assumed that the laser beam flux is incident in parallel to the deflection surface of the deflector 41. Accordingly, the scanning optical system is set like the case in which the rotating axis of the deflector 41 is inclined by about 10° from the rotating axis of the deflector 42 as shown in FIG. 1. That is, the attaching surface of the optical box 100 is set such that optical axis centers of the laser beam sources 11 and 12, collimator lenses 21 and 22, and compound cylindrical lens 31 are inclined by about 10° according to the inclination of the deflector 41.

Using the first imaging lens 51 and second imaging lens 61 which are of the f-θ lens, the f-θ correction is performed to the laser beam flux which is reflected and deflected near a point 41a on the polygon mirror surface in the deflector 41. The laser beam flux to which the f-θ correction is performed is reflected toward an inside direction of the optical box 100 by the reflecting mirror 71 provided in one end portion of the optical box 100. Then, the laser beam flux is reflected upward by the reflecting mirror 72, the laser beam flux proceeds toward the irradiation point direction in the surface of the photosensitive drum corresponding to the K color, and the laser beam flux is imaged on the surface of the photosensitive drum corresponding to the K color.

Using the first imaging lens 52 and the second imaging lens 62 which are of the f-θ lens, the f-θ correction is performed to the laser beam flux which is reflected and deflected near a point 41b on the polygon mirror surface in the deflector 41. The laser beam flux to which the f-θ correction is performed proceeds toward an upper portion in the central portion of the optical box 100. Then, the laser beam flux passes through the center position of the optical box 100, and the laser beam flux is reflected upward by the reflecting mirror 73 disposed on the side of the deflector 42. Then, the laser beam flux passes through C color adjacent to the K color, the laser beam flux proceeds toward the irradiation point direction in the surface of the photosensitive drum corresponding to the M color adjacent the C color, and the laser beam flux is imaged on the surface of the photosensitive drum corresponding to the M color.

As is clear from the above description, in the first embodiment, the basic optical path is inclined by about 10° to overlap the basic optical path on the side of the deflector 42. That is, as shown in FIG. 1, the deflection planes of the deflectors 41 and 42 overlap each other when viewed from the direction normal to the bottom surface of the optical box. As a result, the following effects are obtained.

(1) The optical path is lengthened in the optical box 100, so that the number of reflecting mirrors can be decreased.

(2) Because vibration directions caused by the rotation are not matched with each other in the two deflectors, even if a balance is changed between the two deflectors, the vibrations of the two deflectors interfere with each other to be able to prevent the beat phenomenon in the optical box.

(3) The final-stage reflecting mirrors can collectively be disposed in the upper portion of the optical box, an access to the reflecting mirrors are easily achieved when the four laser beam fluxes are adjusted such that the inclination and bending of the four laser beam fluxes are uniformed. Therefore, process automation is promoted.

As with the deflector 41, the single BD signal is used in the deflector 42, so that the BD signal is used as the trigger signal for starting image write of both the K and M colors. In the first embodiment, the parallel laser beams are incident to the one deflector. Alternatively, an obliquely incident optical system may be used.

Second Embodiment

Scanning Optical Apparatus

Figure 3:
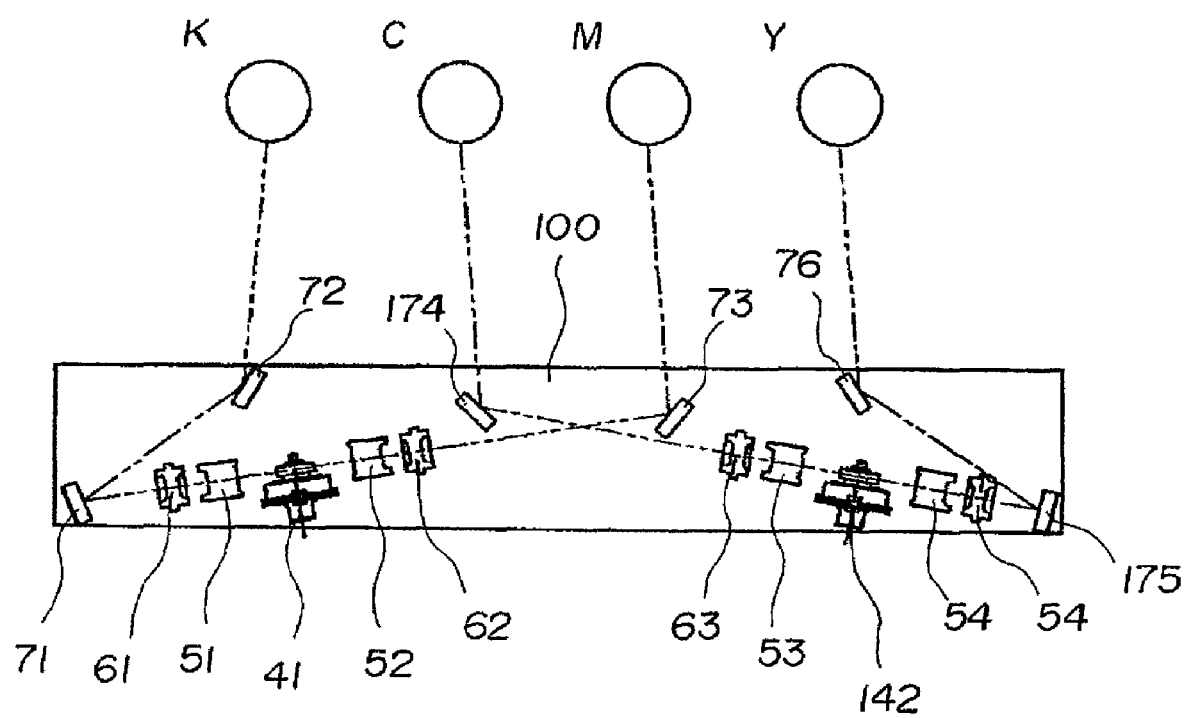
FIG. 3 shows a scanning optical apparatus according to a second embodiment of the invention.

FIG. 3 shows a scanning optical apparatus according to a second embodiment of the invention. In the second embodiment, because a deflector 142 is inclined by about 10° in the opposite direction of the deflector 41, a reflecting mirror 175 disposed in one end portion of the optical box 100 is located below the reflecting mirror 75 (see FIG. 1). A reflecting mirror 174 is located above the reflecting mirror 74 (see FIG. 1), and the reflecting mirrors 72, 174, 73, and 76 which constitute the final-stage reflecting mirrors can be attached at the substantially same level.

Thus, although the scanning optical apparatus and image forming apparatus according to the embodiments of the invention are described above, other embodiments, application, modifications, and combinations thereof can be made without departing from the scope of the invention.

According to the scanning optical apparatus of the invention, because the deflection planes of the two deflectors is relatively inclined from the attaching reference plane, the optical path length of the laser beam in the oblique direction is obtained by utilizing the diagonal space in the optical box, and the number of reflecting mirrors can be decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-287850 filed Oct. 23, 2006, which is hereby incorporated by reference herein in its entirety.

What is claimed is:

1. An image forming apparatus comprising:
a plurality of photosensitive members, arranged so that rotating axes of the photosensitive member are parallel to one another; and
a scanning optical apparatus comprising plural laser beam sources, each configured to emit a laser beam to form a latent image on a respective one of the plurality of photosensitive members;
wherein the scanning optical apparatus further comprises:
a first rotating polygon mirror which deflects a first laser beam and a second laser beam;
a second rotating polygon mirror which deflects third laser beam and a fourth laser beam;
a plurality of reflecting mirrors which lead laser beams deflected by the first and second rotating polygon mirrors to the plurality of photosensitive members, wherein the plurality of reflecting mirrors are provided corresponding to the first, second, third and fourth laser beams respectively; and
an optical box in which the first and second rotating polygon mirrors and the plurality of reflecting mirrors are accommodated,
wherein the second laser beam is reflected by the first rotating polygon mirror in a direction generally toward the second rotating polygon mirror, and the third laser beam is reflected by the second rotating polygon mirror in a direction generally toward the first rotating polygon mirror,
wherein a rotating axis of the first rotating polygon mirror is inclined with respect to a rotating axis of the second rotating polygon mirror, and
wherein the reflecting mirror that leads the second laser beam to the photosensitive member and the reflecting mirror that leads to the third laser beam to the photosensitive member are arranged so that a route of the second laser beam reflected by the first rotating polygon mirror and a route of the third laser beam reflected by the second rotating polygon mirror cross each other in the optical box.

2. The image forming apparatus according to claim 1, wherein the different photosensitive members which are not adjacent to each other in the plurality of photosensitive members are irradiated with the first laser beam and the second laser beam respectively.

3. The image forming apparatus according to claim 1, wherein the different photosensitive members which are not adjacent to each other in the plurality of photosensitive members are irradiated with the third laser beam and the fourth laser beam respectively.

4. The image forming apparatus according to claim 1, wherein the rotating axis of the first polygon mirror or the second polygon mirror is inclined by about 8 to about 15° from the predetermined direction and a direction orthogonal to rotating axis directions of the plurality of photosensitive members.

5. The image forming apparatus according to claim 1, wherein the first rotating polygon mirror is disposed so that a deflection plane of the first rotating polygon mirror formed by the laser beam is parallel to a bottom surface of the optical box.

6. The image forming apparatus according to claim 1, wherein deflection planes formed by the laser beams reflected by the first rotating polygon mirror and the second rotating polygon mirror overlap each other when viewed from the direction normal to a bottom surface of the optical box.

7. An image forming apparatus comprising:
a plurality of photosensitive members, arranged so that rotating axes of the photosensitive member are parallel to one another; and
a scanning optical apparatus comprising plural laser beam sources, each configured to emit a laser beam to form a latent image on a respective one of the plurality of photosensitive members;
wherein the scanning optical apparatus further comprises:
a first rotating polygon mirror which deflects a first laser beam and a second laser beam;
a second rotating polygon mirror which deflects a third laser beam and a fourth laser beam;
a plurality of reflecting mirrors which lead laser beams deflected by the first and second rotating polygon mirrors to the plurality of photosensitive members, wherein the plurality of reflecting mirrors are provided to reflect the first, second, third and fourth laser beams; and
an optical box in which the first and second rotating polygon mirrors and the plurality of reflecting mirrors are accommodated,
wherein the second laser beam is reflected by the first rotating polygon mirror in a direction generally toward the second rotating polygon mirror, and the third laser beam is reflected by the second rotating polygon mirror in a direction generally toward the first rotating polygon mirror,
wherein at least one of rotating axes of the first and second rotating polygon mirrors is inclined with respect to a direction normal to a bottom surface of the optical box, and
wherein the reflecting mirror that leads the second laser beam to the photosensitive member and another reflecting mirror that leads the third laser beam to another photosensitive member are arranged so that a route of the second laser beam and a route of the third laser beam cross in the optical box.

8. The image forming apparatus according to claim 7, wherein the different photosensitive members which are not adjacent to each other in the plurality of photosensitive members are irradiated with the first laser beam and the second laser beam respectively.

9. The image forming apparatus according to claim 7, wherein the different photosensitive members which are not adjacent to each other in the plurality of photosensitive members are irradiated with the third laser beam and the fourth laser beam respectively.

10. The image forming apparatus according to claim 7, wherein the rotating axis of the first polygon mirror or the second polygon mirror is inclined by about 8 to about 15° from the predetermined direction and a direction orthogonal to rotating axis directions of the plurality of photosensitive members.

11. The image forming apparatus according to claim 7, wherein the first rotating polygon minor is disposed so that a deflection plane of the first rotating polygon minor formed by the laser beam is parallel to the bottom surface of the optical box.

12. The image forming apparatus according to claim 7, wherein deflection planes formed by the laser beams reflected by the first rotating polygon mirror and the second rotating polygon mirror overlap each other when viewed from the direction normal to the bottom surface of the optical box.

* * * * *